United States Patent [19]
Itoh et al.

[11] 3,936,476
[45] Feb. 3, 1976

[54] SILICONE COMPOSITIONS CONTAINING PLATINUM-CONTAINING MATERIAL AND MANGANESE CARBONATE
[75] Inventors: Kunio Itoh; Takeo Yoshida, both of Annaka, Japan
[73] Assignee: Shinetsu Chemical Company, Japan
[22] Filed: Jan. 8, 1975
[21] Appl. No.: 539,428

Related U.S. Application Data
[63] Continuation-in-part of Ser. No. 332,495, Feb. 14, 1973, abandoned.

[30] Foreign Application Priority Data
Feb. 14, 1972  Japan............................. 47-15479

[52] U.S. Cl. ...................... 260/37 SB; 260/45.75 R
[51] Int. Cl.²......................................... C08L 83/04
[58] Field of Search ............... 260/37 SB, 45.75 R; 106/15 FP

[56]  References Cited
UNITED STATES PATENTS

| | | |
|---|---|---|
| 2,397,320 | 3/1945 | Koch............................... 106/15 FP |
| 3,082,181 | 3/1963 | Brown et al................... 260/45.75 R |
| 3,514,424 | 5/1970 | Noble et al. .................. 260/45.75 R |
| 3,711,520 | 1/1973 | Pfeifer et al..................... 260/37 SB |
| 3,862,081 | 1/1975 | Itoh et al........................ 260/37 SB |

Primary Examiner—Donald E. Czaja
Assistant Examiner—S. M. Person
Attorney, Agent, or Firm—McGlew and Tuttle

[57]  ABSTRACT

Silicone compositions consisting essentially of 100 parts by weight organopolysiloxane, 20–200 parts by weight finely divided silica filler, 5–100 parts by weight finely divided manganese carbonate, and 5–1,000 ppm platinum alone or in a platinum containing material, based on the weight of the organopolysiloxane. Finished products prepared by molding the compositions exhibit particularly excellent flameproofing and improved degrees of permanent strain caused by stress. Particularly preferred are silicone compositions with 5–100 parts by weight of finely divided manganese carbonate having a particle size from about $1\mu$ to about $50\mu$.

4 Claims, No Drawings

SILICONE COMPOSITIONS CONTAINING PLATINUM-CONTAINING MATERIAL AND MANGANESE CARBONATE

CROSS-REFERENCE TO PRIOR APPLICATION

This application is a continuation-in-part of application Ser. No. 332,495 filed on Feb. 14, 1973, "SILICONE COMPOSITIONS", and now abandoned.

FIELD AND BACKGROUND OF THE INVENTION

This invention relates to silicone compositions having improved properties and, in particular, to silicone elastomer stock compositions which are useful in the preparation of silicone elastomers, having the property of flameproofing or self-extinguishing after the igniting condition has been removed, and also good elasticity or capability of improving strains with low degrees of permanent strain after release of stress.

DESCRIPTION OF THE PRIOR ART

Silicone elastomers have been used in various fields for their elasticity and some other advantageous properties, but they have been found defective because of their own combustibility. Some attempts have been made to render silicone elastomers incombustible, for example, by incorporating a finely divided cupreous material in the silicone compounds comprising methylphenylpolysiloxane and a filler, as described in U.S. Pat. No. 2,891,033 or by incorporating a platinum-containing material in the silicone compounds comprising an ordinary organopolysiloxane and a filler, as disclosed in U.S. Pat. No. 3,514,424. However, these silicone elastomers have failed to exhibit satisfactory self-extinguishing property, as well as elastic strain characteristics. Specifically, the cupreous material-containing silicone elastomers have not been able to be free of coloration, and to be unsuitable for wire coating in different colors, while the platinum-containing elastomers have been defective in that heat resistance, which is an essential requirement, would be degraded, and their incombustibility would not be attained to sufficient degrees.

It is also known that antimony oxide, or the like, flame-retardants have been incorporated in various molding plastics in order to render them hardly combustible. However, the presence of such known flame-retardants in silicone compositions would, disadvantageously, result in the degradation of the inherent properties possessed by the silicone elastomers to be prepared therefrom.

OBJECT OF THE INVENTION

It is a primary object of the present invention to provide silicone compositions, which are free from the abovedescribed drawbacks, and which are capable of producing molded articles having excellent mechanical strength and heat resistance.

DESCRIPTION OF THE INVENTION

The silicone compositions comprise essentially (a) 100 parts by weight of an organopolysiloxane having the general formula
$R_aSiO_{4-a/2}$
wherein R is a substituted or unsubstituted monovalent hydrocarbon radical, and $a$ is from 1.90 to 2.05, (b) 20 to 200 parts by weight of a finely divided silica filler, (c) 5 to 100 parts by weight of finely divided manganese carbonate, preferably having a particle size of from about 1 micron($\mu$) to about $50\mu$, and (d) 5 to 1,000 p.p.m. of platinum alone or in a platinum-containing compound, based on the weight of component (a).

The silicone compositions of this invention will be illustrated in further detail.

This invention has been accomplished based on the discovery that when compositions comprising the above-mentioned components (a), (b), (c) and (d) are heated and cured in the presence of a known cross-linking agent, they are converted, as ordinary heat-curable silicone rubbers are, to rubbery elastomers having excellent heat resistance and tear strength, and further, that when a strip of the elastomer is suspended vertically and exposed to fire at its lower tip, it continues to burn until the fire is removed, and then the flame becomes self-extinguishing. It has also been ascertained that the elastomers thus produced are improved with respect to permanent strain which would usually be caused by use of a certain cross-linking agent.

The organopolysiloxane as component (a) in this invention, which is usually employed as a main component of a silicone elastomer stock, is a straight-chained polysiloxane having the general formula
$R_aSiO_{4-a/a}$
where R is a substituted or unsubstituted monovalent hydrocarbon radical selected from the group consisting of methyl, ethyl, propyl and phenyl radicals, their halogen-substituted hydrocarbon radicals, and vinyl and allyl radicals, and $a$ is from 1.90 to 2.05.

The organopolysiloxane has a viscosity exceeding 100,000 cs. at 25°C, desirably exceeding 1,000,000 cs. It may contain in its structure $CH_3SiO_{1.5}$ units, so long as their amount is small, say, less than 5 mole %. Further, it may be terminated with hydroxyl or trimethylsilyl radicals.

The finely divided silica filler as component (b), can be a known filler customarily used for silicone rubbers, such as fume silica, precipitated silica, quartz or diatomaceous earth, in fine powders, preferably having a particle size less than about $50\mu$ for at least 90% thereof. Generally speaking, if the amount of component (b) used is too large, the physical properties of the resulting cured silicone elastomers would be degraded, and if it is, on the other hand, too small, the mechanical characteristics, such as tear strength, of the silicone elastomer would be deteriorated. In this invention, therefore, component (b) should be used in an amount of from 20 to 200 parts by weight per 100 parts by weight of component (a), as set forth above.

The finely divided manganese carbonate used as component (c), in cooperation with component (d) to be described later, imparts excellent flame-retardant and self-extinguishing properties to the resulting silicone elastomers due to its function of generating $CO_2$ gas under heat as well as its catalytic function. It has also been ascertained that this component is capable of highly improving the elastic strain of the resulting products. It is preferred that component (c) is so finely divided that at least 90% thereof has a particle size less than $50\mu$. Further, it has been found that the size of the particles are critical and should be preferably from about $1\mu$ to about $50\mu$ size. In order for the resulting silicone elastomer products to have high flame retardancy and elasticity without degrading their proper characteristic properties, it is required to incorporate component (c) in the composition in an amount of from 5 to 100 parts by weight per 100 parts by weight of component (a).

If considered only from their function of generating $CO_2$ gas, calcium carbonate, zinc carbonate, cobalt carbonate, sodium carbonate and the like would similarly be effective in the attainment of the objects of this invention. However, it has been found that these carbonates impart no improved self-extinguishing effects to the resulting elastomers and, additionally, exert bad influences on the heat resistance of the elastomers. Those carbonates, therefore, are unsuitable for use in the practice of the invention.

Next, platinum or a platinum-containing compound as component (d) is required for imparting the self-extinguishing property to the silicone composition in cooperation with component (c) above. As platinum-containing compounds, platinic chloride and complexes of platinic chloride with alcohols, ethers and aldehydes may be exemplified. This component also includes materials comprising platinum powders borne on such carriers as alumina, silica gel and asbestos. For the purpose of advantageously imparting the self-extinguishing property in the invention, component (d) should be used in an amount of from 5 to 1,000 p.p.m. as calculated as platinum metal, preferably from 10 to 100 p.p.m., based on the weight of component (a).

The silicone compositions of this invention can be molded into a variety of articles by means of heating and curing. In the heat-cure process, organic peroxides or organohydrogenpolysiloxanes, which are known cross-linking agents (curing agents), may be employed. Examples of the organic peroxides are benzoyl peroxide, tertiarybutyl perbenzoate, 2,4-dichlorobenzoyl peroxide, ditertiary-butyl peroxide, dicumyl peroxide and monochlorbenzoyl peroxide, as the organohydrogenpolysiloxanes, methyl-hydrogenpolysilozanes containing at least two ≡ Si-H links in one molecule are exemplified. In the case where organic peroxide is used, its amount should be from 0.3 to 6 parts by weight per 100 parts by weight of component (a). Further, in the case where the organohydrogenpolysiloxane is used, its amount should be such that the number of the ≡ Si-H links will be from 0.8 to 1.5 per ≡ Si-CH=CH$_2$ link in component (a) which, in this case, should contain at least 2 ≡ Si-CH=CH$_2$ links in an average molecule.

For the preparation of the silicone compositions of the invention, components (a), (b), (c) and (d) are mixed together and kneaded homogeneously by means of a suitable roll kneader. To these components, the above-described organic peroxide or organohydrogenpolysiloxane, may be added. Low molecular weight organic silicone compounds, such as diphenyl silane diol, diphenylmethyl silanol and alkoxysilane, and pigments can be the other additives, according to need. The formulation thus prepared is then heated at about 100° to about 350°C for several seconds to 1 hour under elevated or atmospheric pressure and subjected to post-heating treatment, according to need, to produce cured articles, for example, in shapes of sheets, tapes and insulation on electrical conductors, which have excellent properties in heat resistance, self-extinguishment and rubbery elasticity.

This invention will now be illustrated by reference to the following specific examples in which parts are all by weight. In the examples, the hardness, elongation, tensile strength and permanent strain of the individual test pieces were determined according to Japanese Industrial Standard (JIS) K–6301.

The extinguishing property was evaluated by the following manner.

A sample composition was heated under pressure and cured to produce a rubber sheet having a thickness of 2mm. The sheet was cut to obtain test specimens 0.5 cm wide and 20 cm long. The test specimen thus obtained was held almost vertically so that its lower tip directly contacted the flame of an alcohol lamp for a period of 15 seconds for ignition. Thereupon, the flame was taken away from the specimen, and the time required for extinguishing of the flame was measured. The extinguishing property is expressed in terms of the time recorded in seconds.

EXAMPLE 1

A silicone elastomer stock composed of 100 parts of an organopolysiloxane gum consisting of 99.9 mole % of $(CH_3)_2SiO$ units and 0.1 mole % of $CH_3(CH_2=CH)SiO$ units, 25 parts of fume silica (trade name: Aerosil 200), 20 parts of powdery manganese carbonate, 2.5 parts of diphenyl silane diol as a silica-dispersing agent, 0.05 part of a solution of 2% (as calculated as platinum metal) of platinic chloride in butanol, 50 parts of quartz powder having a particle size of about 5$\mu$ and 5 parts of titanium oxide of the anatase type were uniformly mixed and kneaded on two rolls, and then heat-treated at 150°C for 1 hour. In the mixture thus obtained and treated 0.7 part, per 100 parts thereof, of a silicone oil paste containing 50% benzoyl peroxide was incorporated. The resulting composition was again kneaded on two rolls to produce a composition suitable for molding. This molding composition was press-cured under 30 kg/cm$^2$ at 120°C for 10 minutes into a sheet, which was then post-cured at 150°C for 2 hours. The physical properties of the cured sheet were determined and the results are shown in Table 1.

For comparison, a cured sheet was prepared in the same manner as above, except that powdery manganese carbonate was excluded. The results on this comparative test are also shown in the table.

TABLE 1

|  | This invention | Comparative |
|---|---|---|
| Hardness (JIS) | 55 | 50 |
| Elongation (%) | 300 | 320 |
| Tensile strength (kg/cm$^2$) | 73 | 75 |
| Extinguishing property (sec.) (first test) | 3 | 25 |
| Extinguishing property (sec.) (second test)* | 0 | 33 |

*After completion of the first extinguishing test, the flame of the alcohol lamp was contacted with the specimen again for 15 seconds and the extinguishing property was determined.

EXAMPLE 2

A molding composition was prepared in the same manner as in Example 1, except that 0.2 part of an organohydrogenpolysiloxane, consisting of 2 moles of the $(CH_3)_2(H)SiO_{0.5}$ units and 1 mole of the $SiO_2$ units was employed instead of the silicone oil paste. The composition was molded into a sheet and cured for 30 minutes in an oven maintained at 150°C. When the extinguishing test was conducted on the cured sheet thus obtained, the time required for extinguishment was only 6 seconds, while in the case of a comparative product prepared without employing manganese carbonate, the time required for extinguishment was 35 seconds.

EXAMPLE 3

100 parts of an organopolysiloxane composed of 97.85 mole % of $(CH_3)_2SiO$ units, 2 mole % of $(C_6H_5)_2SiO$ units and 1.15 mole % of $CH_3(CH_2=CH)SiO$ units, 3 parts of methyltriethoxysilane, 45 parts of fume silica and 4 parts of diphenyl silane diol were mixed uniformly by means of two rolls. The mixture was heat-treated at 150°C for 3 hours. The resulting mixture was divided into portions to obtain 6 samples, in each of which the additive components in amounts as indicated in Table 2 were incorporated. These compositions were then molded into sheets in the same manner as in Example 1. The results are tabulated in the table.

TABLE 2

| Sample No. | Base mixture | Manganese carbonate added | Quartz powder added | Platinic chloride (2% solution) added | Benzoyl peroxide (50% paste) added | Extinguishing property |
|---|---|---|---|---|---|---|
| | (parts) | (parts) | (parts) | (parts) | (parts) | (sec.) |
| 3-1 (comparison) | 100 | 0 | 30 | 0.1 | 1.0 | 35 |
| 3-2 (this invention) | 100 | 15 | 15 | 0.1 | 1.0 | 2 |
| 3-3 (comparison) | 100 | 0 | 50 | 0.05 | 1.0 | 30 |
| 3-4 (this invention) | 100 | 30 | 20 | 0.05 | 1.1 | 0 |
| 3-5 (this invention) | 100 | 40 | 0 | 0.05 | 1.2 | 0 |
| 3-6 (comparison) | 100 | 0 | 0 | 0.1 | 1.0 | 60 |

TABLE 3

| Physical Properties | Sample 3-1' (Comparison) | Sample 3-2' (this invention) |
|---|---|---|
| Hardness (JIS) | 57 | 62 |
| Elongation (%) | 350 | 320 |
| Tensile strength (kg/cm²) | 83 | 85 |
| Permanent strain (%) | 50 | 18 |
| Extinguishing property (sec.) | 30 | 3 |

Note:
Percentage of the permanent strain is determined by B/A × 100 and A is original thickness of the material, and B is the thickness of its part which remains unrecovered after release of stress.

EXAMPLE 5

100 parts of a dimethylpolysiloxane composed of the units $(CH_3)_2SiO$ units, 30 parts of precipitated silica, 5 parts of methyltrimethoxysilane, 30 parts of powdery manganese carbonate, 0.1 part of a solution of 2% of a solution of 2% (as calculated as platinum metal) of platinic chloride in 2-ethylhexanol, and 3 parts of a paste containing 50% of benzoyl peroxide were mixed uniformly by means of two rolls. The mixture was then press-molded at 120°C, to obtain a sheet having a thickness of 2 mm. The sheet was post-cured at 150°C for 4 hours. The resulting cured material was subjected to the extinguishing test. As a result, it was found that the material was not at all ignited.

EXAMPLE 4

In the same manner as in Example 3, samples 3-1' and 3-2' were prepared from the same compositions as of samples 3-1 and 3-2 in Example 3, respectively, except that 1.3% of 2,4-dichlorobenzoyl peroxide, which has a defect of increasing the permanent strain on silicone rubbers, was used instead of the benzoyl peroxide. Each sample was pressed under 30 kg/cm² at 120°C for 10 minutes, to produce sheets having a thickness of 2 mm and also sheets of a thickness of 12 mm. These sheets were then post-cured at 200°C for another 4 hours. In the determination of the physical properties as shown in Table 3, the 2 mm thick sheets were used except for permanent strain. For the determination of the permanent strain, the 12 mm thick sheets were used.

EXAMPLE 6

For comparative purposes, the same procedure as of Example 1 was repeated, except that the powdery manganese carbonate was replaced with sodium carbonate, calcium carbonate or zinc carbonate. The results are shown in the following table. The sample sheets were further heated at 250°C for 24 hours to determine their respective hardness, elongation and tensile strength, the results of which are also given in the following Table 4.

TABLE 4

| | Manganese carbonate (this invention) | Sodium carbonate (comparison) | Caldium carbonate (comparison) | Zinc carbonate (comparison) |
|---|---|---|---|---|
| Hardness (JIS) | 55 | | 57 | 53 |
| Elongation (%) | 300 | | 295 | 330 |
| Tensile strength (kg/cm²) | 73 | | 77 | 56 |
| Extinguishing Property (sec.): | | No good | | |

TABLE 4-continued

|  | Manganese carbonate (this invention) | Sodium carbonate (comparison) | Caldium carbonate (comparison) | Zinc carbonate (comparison) |
|---|---|---|---|---|
| First test | 3 | sheet was obtained. | Burnt out | 5 |
| Second test | 0 |  | — | 35 |
| At 250°C for 24 hours: |  |  |  |  |
| Hardness (JIS) | 57 |  | 60 | 75 |
| Elongation (%) | 200 |  | 170 | 90 |
| Tensile strength (kg/cm²) | 63 |  | 66 | 30 |

It was also observed that the sheet comprising zinc carbonate, which exhibited an excellent extinguishing property, became to rapidly lose its flame-retardancy after ignition had been repeated several times, while its heat resistance was remarkably bad and its permanent strain was as large as about 3 times that of the sheet comprising manganese carbonate.

EXAMPLE 7

A mixture was prepared from the following four ingredients in the manner described in the specification hereinabove and Examples:

| | | |
|---|---|---|
| (a) | Organopolysiloxane gum consisting of 99.85 mole % $(CH_3)_2SiO$ unit and 0.15 mole % $(CH_2=CH)(CH_3)SiO$ unit | 100 parts |
| (b) | Fume silica (tradename: Aerosil 130) | 25 parts |
| (c) | Hexamethyldisilazane (as a silica-dispersing agent) | 4 parts |
| (d) | Polydimethylsiloxane, terminated with hydroxy groups at both ends and having a viscosity of 10 cs | 3 parts |

Remarks:
(i) Parts mentioned herein are all by weight.
(ii) The organopolysiloxane gum above was used as a 1% solution in toluene, having a viscosity of 2.5 cs.
(iii) Viscosities are all at 25°C.

The mixture thus prepared was kneaded on a 2-roll mill at 150°C for 2 hours. The resulting compound was divided into portions to obtain 4 test samples, and to each sample were added the following 4 ingredients:

| | | |
|---|---|---|
| (e) | A solution of 2% (as calculated as platinum metal) platinic chloride in isopropyl alcohol | 0.05 part |
| (f) | Finely divided manganese carbonate having each one of the different particle sizes as indicated in the following Remark | 20 parts |
| (g) | Finely divided quartz having a particle size of about 5μ | 30 parts |
| (h) | Silicone oil paste containing 50% benzoyl peroxide | 1.5 parts |

Remarks:
(i) The above-mentioned parts are based on 100 parts by weight of the test sample.
(ii) The particle size of the manganese carbonate used in the making of each test sample was 5, 30, 70 or 100μ, respectively, on an average for its 90% or greater part.

The 4 test samples were individually applied to a 2-roll mill and then press-cured under 30 kg/cm² at 120°C for 10 minutes, to finally obtain cured sheets, 2 mm thick. Apart from those samples which included manganese carbonate, there was prepared a similar test sample excepting the inclusion of manganese carbonate. This is referred to as a "blank" sample. The test results are shown in the Table 5 below. The various physical properties mentioned therein are the same as set forth in the description of Example 1.

TABLE 5

|  | Manganese Carbonate | | | | |
|---|---|---|---|---|---|
|  | 5μ | 30μ | 70μ | 100μ | Blank |
| Hardness | 56 | 53 | 49 | 45 | 44 |
| Elongation | 360 | 330 | 215 | 190 | 420 |
| Tensile Strength | 85 | 80 | 41 | 37 | 80 |
| Extinguishing Property: |  |  |  |  |  |
| First test | 2 | 5 | 26 | 33 | 40 |
| Second test | 0 | 0 | 35 | 39 | 43 |

From the results shown in the foregoing Table, it is seen that there is a vast difference in extinguishing properties for use of manganese carbonate in silicone compositions when the manganese carbonate compositions have a particle size less than 70μ, i.e., for particle sizes of 5μ and 30μ. The tests show a difference in kind, not merely in degree.

The particle size of manganese carbonate used in Examples 1 through 6 was tested as follows:

| | |
|---|---|
| Example 1 | 5.2μ |
| Example 2 | 5.2μ |
| Example 3 | 3.4μ |
| Example 4 | 3.4μ |
| Example 5 | 4.8μ |
| Example 6 | 7.4μ |

The above determination of particle size was conducted, using a Fischer Subsieve-sizer which is an apparatus for determining particle size well known in the art of handling powdery material.

In order that the criticality of the above particle size range may be more clearly seen, two test samples are added to those presented. These two test samples were obtained according to the same procedure and conditions as outlined hereinabove, except that the two manganese carbonate compositions each had a particle size of 1.4 or 47μ. The test results for the various physical properties of these two new samples are given in the following Table to supplement the Table presented hereinabove.

TABLE

|  | Manganese Carbonate | |
|---|---|---|
|  | 1.4μ | 47μ |
| Hardness | 57 | 50 |
| Elongation | 375 | 250 |
| Tensile strength | 88 | 63 |
| Extinguishing property: |  |  |
| First test | 2 | 14 |
| Second test | 0 | 3 |

What is claimed is:

1. Silicone compositions which comprise a. 100 parts by weight of an organopolysiloxane having the formula:
$R_aSiO_{4-a/2}$
wherein R is a member selected from the group consisting of substituted and unsubstituted monovalent hydrocarbon radicals; and $a$ is a number from about 1.90 to about 2.05;

b. from about 20 to about 200 parts by weight of finely divided silica filler, c. from about 5 to about 100 parts by weight of manganese carbonate having a particle size of from about $1\mu$ to about $50\mu$ and d. from about 5 to about 1,000 parts per million parts by weight of a platinum-containing composition, at least a part of which is platinum, the parts of platinum in said composition being based on the weight of the said organopolysiloxane component (a).

2. Silicone composition consisting essentially of a. 100 parts by weight of an organopolysiloxane having the formula:
$R_aSiO_{4-a/2}$
wherein R is a member selected from the group consisting of substituted and unsubstituted monovalent hydrocarbon radicals; and $a$ is a number from about 1.90 to about 2.05;

b. from about 20 to about 200 parts by weight of finely divided silica filler;

c. from about 5 to about 100 parts by weight of manganese carbonate having a particle size of from about $1\mu$ to about $50\mu$;

d. from about 5 to about 1,000 parts per million by weight of platinum, said weight of platinum being based on the weight of organopolysiloxane component (a); and e. from about 0.3 to about 6 parts by weight of organic peroxide.

3. Silicone composition consisting essentially of a. 100 parts by weight of an organopolysiloxane having the formula
$R_aSiO_{4-a/2}$
wherein R is a member selected from the group consisting of substituted and unsubstituted monovalent hydrocarbon radicals; and $a$ is a number from about 1.90 to about 2.05, and wherein $a$ contains at least 2 $\equiv$Si-CH=CH$_2$ moieties in an average radical;

b. from about 20 to about 200 parts by weight of finely divided silica filler;

c. from about 5 to about 100 parts by weight of manganese carbonate having a particle size of from about $1\mu$ to about $50\mu$;

d. from about 5 to about 1,000 parts per million parts by weight of platinum, said weight of platinum being based on the weight of organopolysiloxane component (a); and e. organohydrogenpolysiloxane in such an amount that the number of $\equiv$Si—H moieties is from about 0.8 to about 1.5 per $\equiv$SiCH=CH$_2$ moiety in organpolysiloxane component (a).

4. The silicone composition according to claim 1, wherein said component (d) is present in an amount of from about 10 to 100 parts per million.

* * * * *